(12) United States Patent
Hu

(10) Patent No.: US 8,527,509 B2
(45) Date of Patent: Sep. 3, 2013

(54) SEARCH METHOD, SYSTEM AND DEVICE

(75) Inventor: Hanqiang Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 280 days.

(21) Appl. No.: 13/070,265

(22) Filed: Mar. 23, 2011

(65) Prior Publication Data

US 2011/0173192 A1 Jul. 14, 2011

Related U.S. Application Data

(63) Continuation of application No. PCT/CN2009/073971, filed on Sep. 16, 2009.

(30) Foreign Application Priority Data

Sep. 26, 2008 (CN) .......................... 2008 1 0216521
Dec. 24, 2008 (CN) .......................... 2008 1 0190595

(51) Int. Cl.
*G06F 17/30* (2006.01)

(52) U.S. Cl.
USPC ......................................................... 707/723

(58) Field of Classification Search
None
See application file for complete search history.

(56) References Cited

U.S. PATENT DOCUMENTS

| | | | |
|---|---|---|---|
| 2003/0220913 A1 | 11/2003 | Doganata et al. | |
| 2006/0288001 A1* | 12/2006 | Costa et al. | 707/5 |
| 2007/0022097 A1* | 1/2007 | Twalt | 707/3 |
| 2007/0150450 A1* | 6/2007 | Murase | 707/3 |
| 2008/0281810 A1* | 11/2008 | Smyth et al. | 707/5 |

FOREIGN PATENT DOCUMENTS

| | | |
|---|---|---|
| CN | 1811780 A | 8/2006 |
| CN | 1983253 A | 6/2007 |
| EP | 1158421 A2 | 11/2001 |

OTHER PUBLICATIONS

Written Opinion of the International Searching Authority Dec. 31, 2009 in connection with International Patent Application No. PCT/CN2009/073971.
International Search Report issued Dec. 31, 2009 in connection with International Patent Application No. PCT/CN2009/073971.
Extended European Search Report dated Sep. 26, 2012 in connection with European Patent Application No. 09817228.1, 10 pages.
Meng, et al.; "Building Efficient and Effective Metasearch Engines" ACM Computing surveys, New York, USA vol. 34, No. 1; Mar. 1, 2002, 50 pages.
Partial translation of Office Action dated Dec. 21, 2012 in connection with Chinese Patent Application No. 200810190595.6.
Jia Mao, et al., "Improved Scheduling Algorithm Based on User Profile for Meta Search Engine", Microprocessors, No. 6, Dec. 2008, 3 pages.

* cited by examiner

Primary Examiner — Yuk Ting Choi

(57) ABSTRACT

A search method is provided, which includes: receiving a search request; extracting a user interest model from user personalized data according to the search request; obtaining a meta index of each member engine; selecting a member engine according to the meta index of each member engine, the search request, and the user interest model; and sending the search request to the selected member engine, so as to enable the selected member engine to complete searching. Correspondingly, a search system and related device, such as a search server and a scheduling server, are also provided, thereby improving the system efficiency and search precision.

19 Claims, 14 Drawing Sheets

SEARCH METHOD, SYSTEM AND DEVICE

CROSS-REFERENCE TO RELATED APPLICATIONS

This application is a continuation of International Application No. PCT/CN2009/073971, filed on Sep. 16, 2009, which claims priority to Chinese Patent Application No. 200810216521.5, filed on Sep. 26, 2008 and Chinese Patent Application No. 200810190595.6, filed on Dec. 24, 2008, all of which are hereby incorporated by reference in their entireties.

TECHNICAL FIELD

The present invention relates to the field of communication technologies, and in particular, to a search method, a search system, and a search device.

BACKGROUND

With the development and advance of the science, the communication technologies also develop rapidly, and mobile search technology is a new highlight accompanying the development of the communication technologies. The research of the mobile search technology has become a focus in the industry. An important technology highlighted in the mobile search technology is precise search, that is, provide a user with personalized search services, and achieve that what is obtained by a user what is searched by the user.

In a personalized scheme of processing a meta search in the prior art, a search server searches a meta index of a member engine, calculates the similarity between a search request and a member engine according to the meta index, selects a member engine with a high similarity for serving a user, and distributes the search request to the selected member engine for searching.

The inventors found in the course of implementing the present invention that the member engine selected in the meta search scheme may be inaccurate, thus causing a low search precision.

SUMMARY

In order to improve the search precision, embodiments of the present invention provide a corresponding search method, a search system, and a search device.

A search method is provided, which includes: receiving a search request; extracting a user interest model from user personalized data according to the search request; obtaining a meta index of each member engine; selecting a member engine according to the meta index of each member engine, the search request, and the user interest model; sending the search request to the selected member engine, so as to enable the selected member engine to complete searching.

Correspondingly, a search system using the above search method is provided, where the system includes:

a search service subsystem, configured to receive a search request, and a meta index reported by each member engine, select a member engine according to the meta index of each member engine, the search request and the user interest model, and send the search request to the selected member engine; and at least one member engine, configured to report the meta index of the member engine to the search service subsystem, and complete searching after receiving the search request sent from the search service subsystem.

According to the above embodiments, the user interest model is extracted after the search request is received, and the member engine is selected according to the meta index of each member engine, the search request and the user interest model. That is to say, the member engine is selected after fully considering the factors such as search request and user interest model, and then the searching is completed by the selected member engine, so that the selection of the member engine is more personalized, and the selected engine is related to the user interest, thereby improving the system scheduling (or selection) efficiency and the search precision.

DETAILED DESCRIPTION

Figure 1:
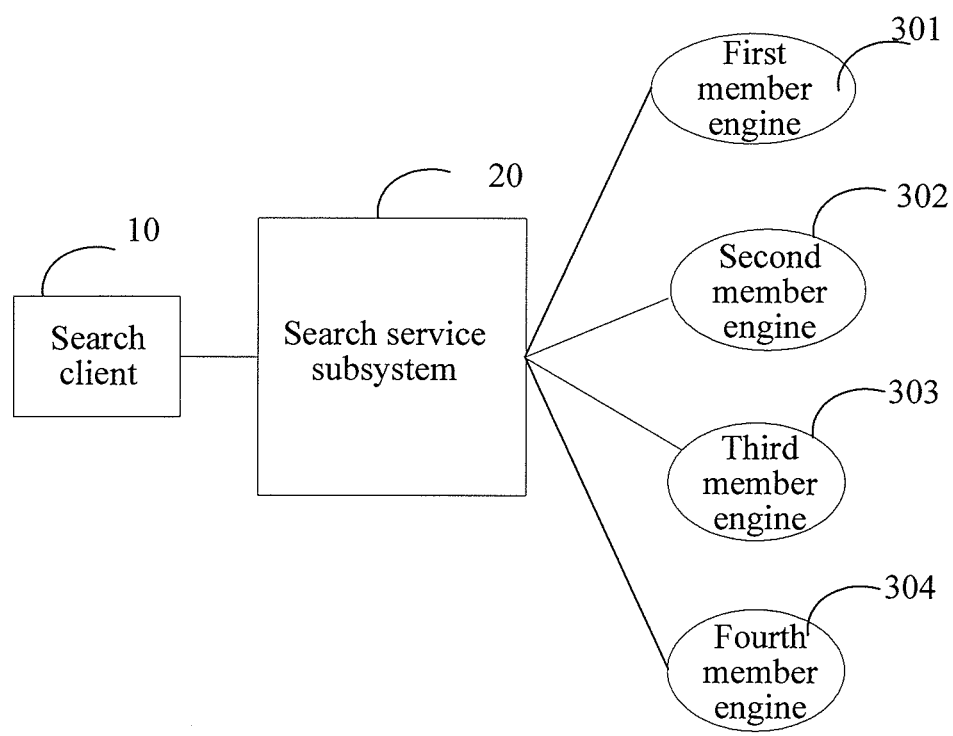
FIG. 1 is a schematic view of a system architecture according to an embodiment of the present invention.

FIG. 1 is a schematic view of a search system according to a search system embodiment. As shown in FIG. 1, the system includes:

a search client 10, configured to send a search request to the search service subsystem;

a search service subsystem 20, configured to receive the search request sent from the search client; extract a user interest model from user personalized data according to the search request; obtain a meta index reported by each member engine; select a member engine according to the meta index of each member engine, the search request, and the user interest model; and send the search request to the selected member engine; and at least one member engine, configured to provide the meta index of the member engine to the search service subsystem, and complete searching after receiving the search request sent from the search service subsystem. In the course of implementation, usually there are several member engines, for example, a first member engine 301, a second member engine 302, a third member engine 303, and a fourth member engine 304.

It should be noted that, in embodiments of the present invention, the member engine refers to various vertical search engines responsible for specific searching in a meta search architecture. The meta index refers to statistical data in the meta search architecture which is dedicated to describe the capability of the member engine and select the member engine. Specifically, the meta index of the member engine is statistical data of a database or a sub-database corresponding to the member engine, a document or a record contained in the database or the sub-database, and a term contained in the document or the record. In the embodiments of the present invention, the meta index of the member engine is used as one criterion for selecting the member engine.

The interest model is a vector composed of weigh scores relative to certain dimensions, and may be expressed as $R=(r1, r2, \ldots ri \ldots, rn)$, where n represents n dimensions, ri is a weigh score of the $i^{th}$ dimension in the interest model, and i is a natural number. The user interest model is a vector composed of weigh scores relative to certain dimensions extracted based on user-related data.

In the above search system, the search service subsystem 20 extracts the user interest model after receiving the search request, and selects the member engine according to the meta index of each member engine, the search request, and the user interest model. That is to say, the member engine is selected after fully considering the factors such as search request and user interest model, and then the searching is completed by the selected member engine, so that the selection of the member engine is more personalized, and the selected engine is related to the user interest, thereby improving the system scheduling (or selection) efficiency and the search precision.

Figure 2:
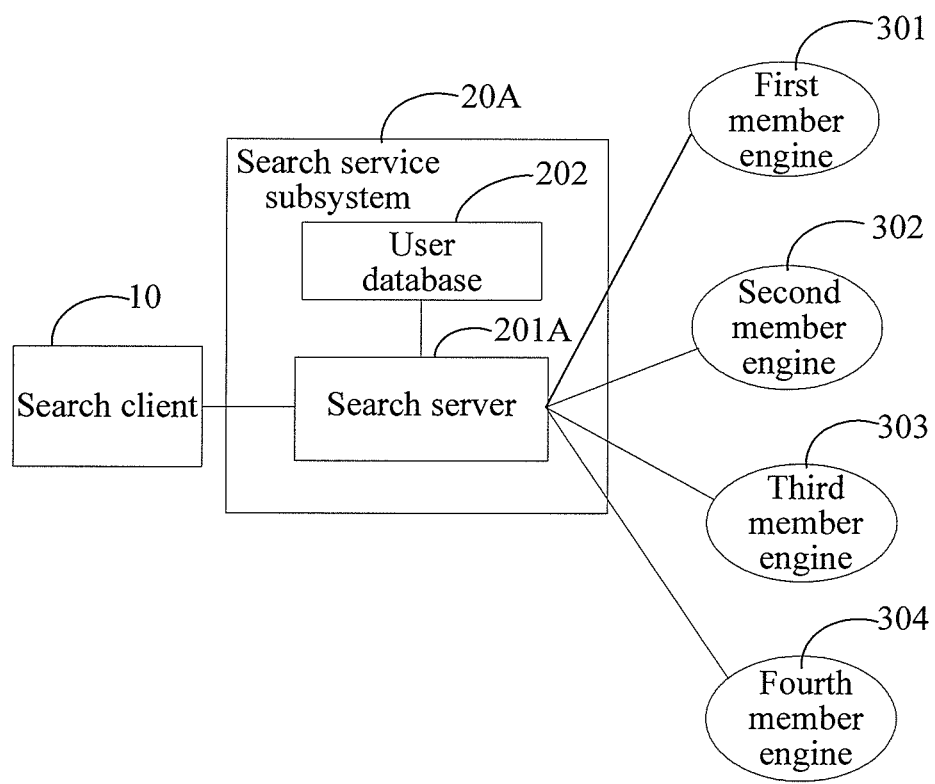
FIG. 2 is a schematic view of a system architecture according to another embodiment of the present invention.

FIG. 2 is a schematic view of an architecture according to another search system embodiment. As shown in FIG. 2, the system is similar to the above system described in FIG. 1, and includes a search client 10, a search service subsystem 20A, and at least one member engine. The search client 10 is configured to send a search request to the search service subsystem. The at least one member engine is configured to provide a meta index of the member engine to the search service subsystem, and complete searching after receiving the search request sent from the search service subsystem. In the course of implementation, usually there are several member engines, for example, a first member engine 301, a second member engine 302, a third member engine 303, and a fourth member engine 304.

The search service subsystem 20A includes a search server 201A and a user database 202, where the user database 202 is configured to store or provide user personalized data; and the search server 201A is configured to receive the search request sent from the search client; extract a user interest model from the user personalized data according to the search request; obtain the meta index reported by each member engine; select a member engine according to the meta index of each member engine, the search request, and the user interest model; and send the search request to the selected member engine.

Figure 3:
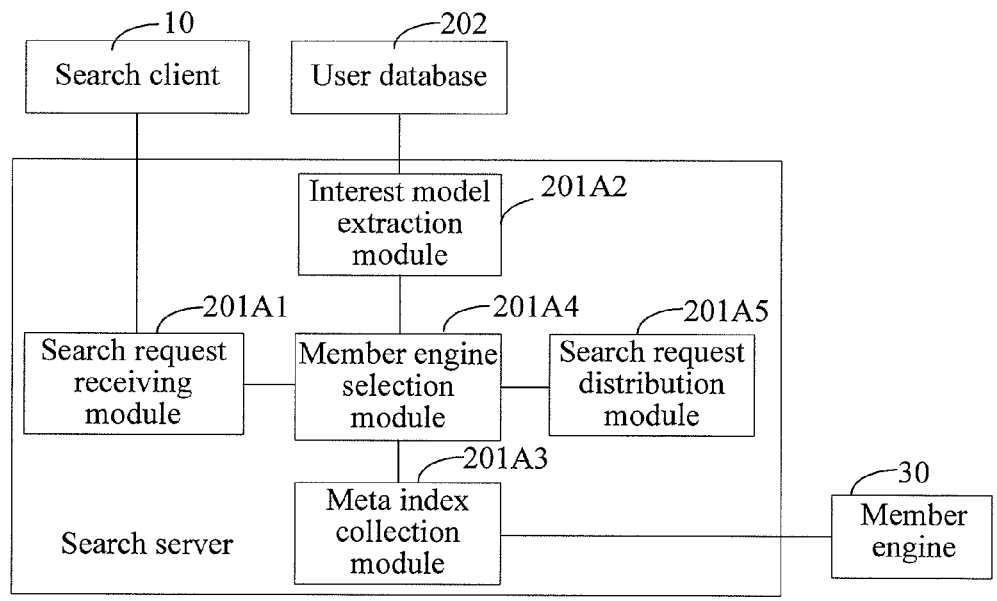
FIG. 3 is a schematic structural view of a device under the system architecture as shown in FIG. 2.

FIG. 3 is a specific schematic structural view of each device under the system architecture as shown in FIG. 2. As shown in FIG. 3, the search server 201A includes:

a search request receiving module 201A1, configured to receive a search request sent from a search client;

a user interest model extraction module 201A2, configured to extract a user interest model from user personalized data according to the search request;

a meta index collection module 201A3, configured to obtain a meta index of each member engine;

a member engine selection module 201A4, configured to select a member engine according to the meta index of each member engine, the search request, and the user interest model; and a search request distribution module 201A5, configured to send the search request to the selected member engine, so as to enable the selected member engine to complete searching according to the search request.

Figure 4:
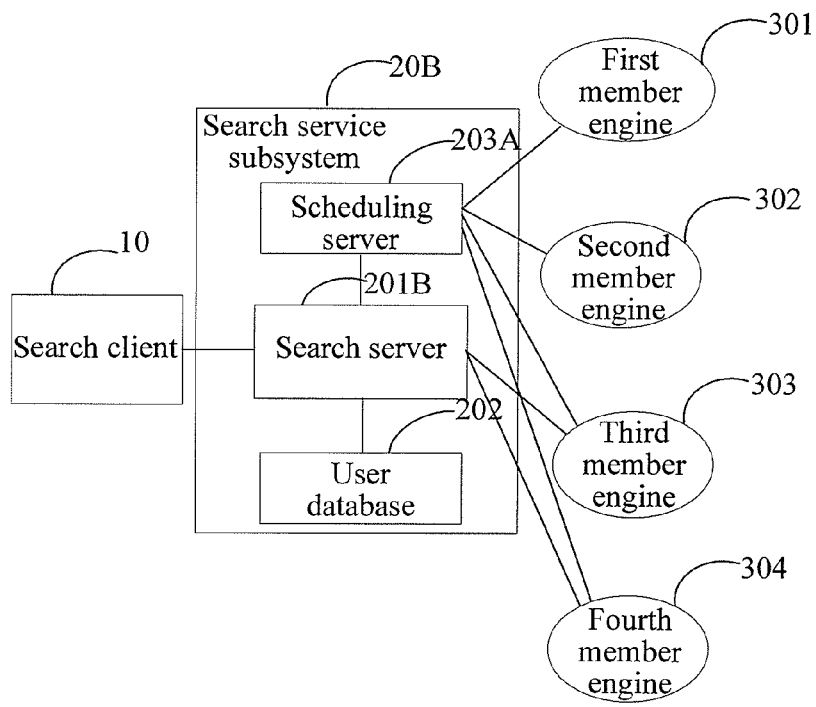
FIG. 4 is a schematic view of a system architecture according to another embodiment of the present invention.

FIG. 4 is a schematic view of another architecture according to a search system embodiment. As shown in FIG. 4, the system is similar to the above system described in FIG. 1, and includes a search client 10, a search service subsystem 20B, and at least one member engine. The search client 10 is configured to send a search request to the search service subsystem. The at least one member engine is configured to provide a meta index of the member engine to the search service subsystem, and a part of the member engines complete searching after receiving the search request sent from the search service subsystem. In the course of implementation, usually there are several member engines, for example, a first member engine 301, a second member engine 302, a third member engine 303, and a fourth member engine 304.

The search service subsystem 20B includes a search server 201B, a scheduling server 203A, and a user database 202.

Specifically, the user database 202 is configured to store or provide user personalized data;

the search server 201B is configured to receive the search request sent from the search client, extract a user interest model from user personalized data according to the search request, send the user interest model and the search request to the scheduling server 203A, receive a member engine selected and returned by the scheduling server 203A, and send the search request to the selected member engine; and the scheduling server 203A is configured to receive the user interest model and the search request sent from the search server 201B, and receive the meta index reported by each member engine; select the member engine according to the meta index of each member engine, the search request, and the user interest model; and return the selected member engine to the search server 201B.

Figure 5:
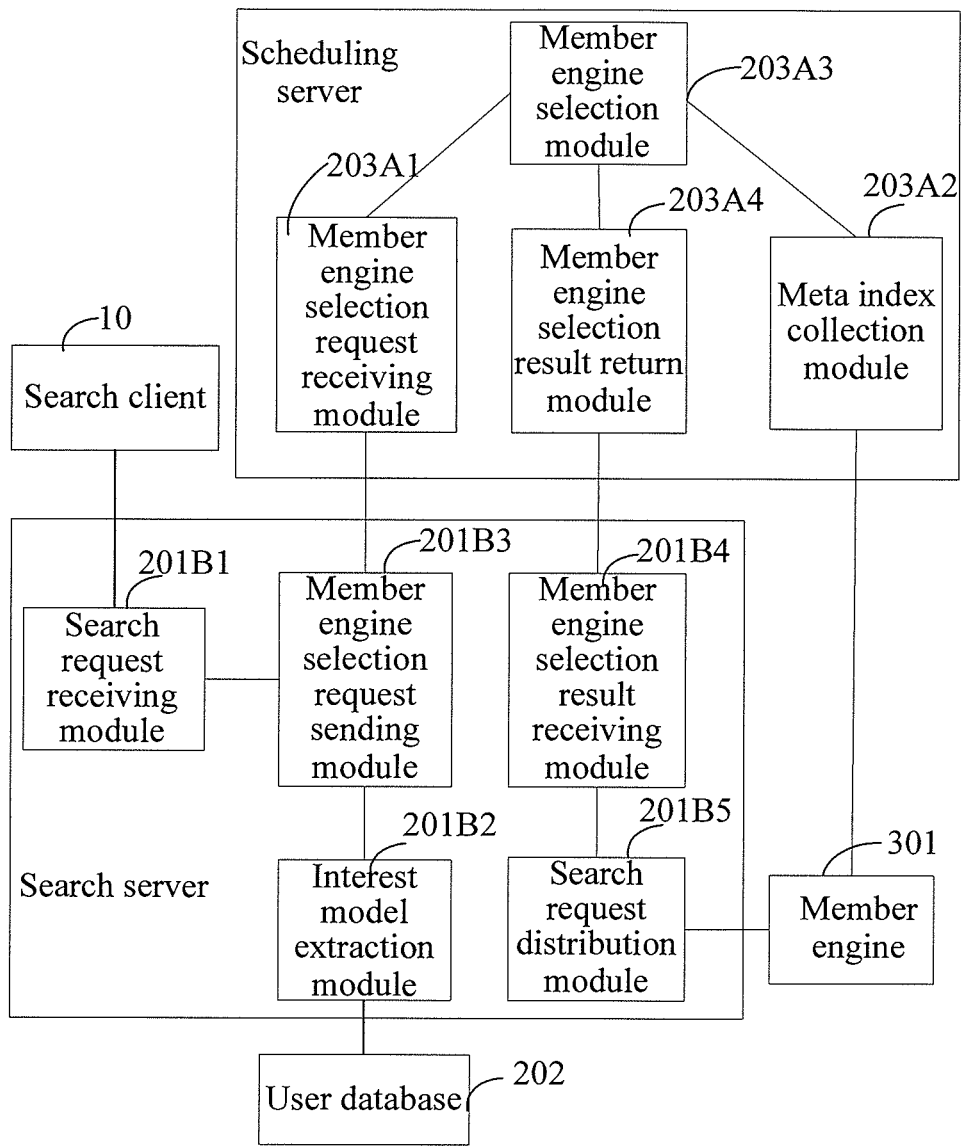
FIG. 5 is a schematic structural view of a device under the system architecture as shown in FIG. 4.

FIG. 5 is a schematic structural view of the search server 201B and the scheduling server 203A under the system architecture as shown in FIG. 4.

The search server 201B includes:

a search request receiving module 201B1, configured to receive a search request sent from a search client, and send the search request to a member engine selection request sending module 201B3;

a user interest model extraction module 201B2, configured to extract a user interest model from user personalized data according to the search request, and send the user interest model to the member engine selection request sending module 201B3;

the member engine selection request sending module 201B3, configured to send the search request and the user interest mode to the scheduling server, so as to enable the scheduling server to select a member engine according to a meta index of each member engine, the search request, and the user interest model;

a member engine selection result receiving module 201B4, configured to receive the member engine selected and returned by the scheduling server; and a search request distribution module 201B5, configured to send the search request to the selected member engine, so as to enable the selected member engine to complete searching according to the search request.

The scheduling server 203A communicating with the above search server 201B includes:

a member engine selection request receiving module 203A1, configured to receive the search request and the user interest model sent from the search server;

a meta index collection module 203A2, configured to obtain the meta index of each member engine;

a member engine selection module 203A3, configured to select the member engine according to the meta index of each member engine, the search request, and the user interest model; and a member engine selection result return module 203A4, configured to send the selected member engine to the search server, so as to enable the search server to send the search request to the selected member engine, and enable the selected member engine to complete searching according to the search request.

Figure 6:
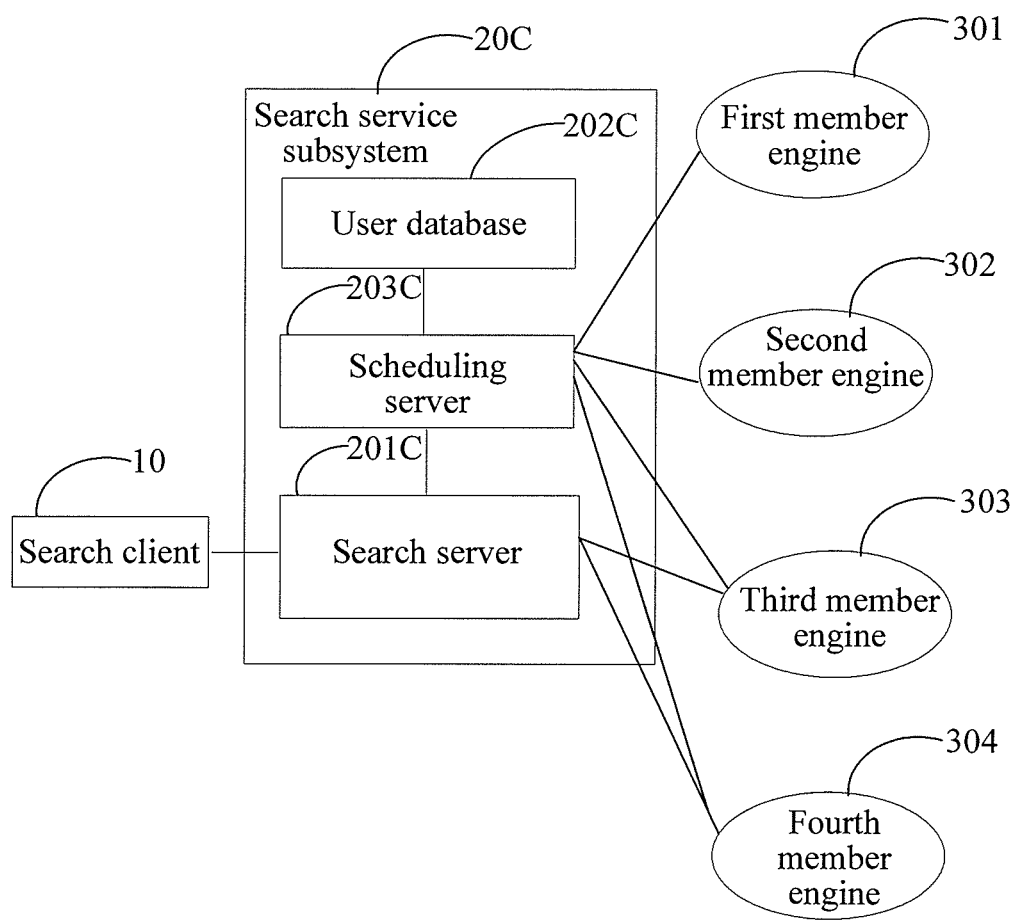
FIG. 6 is a schematic view of a system architecture according to another embodiment of the present invention.

FIG. 6 is a schematic view of a search system architecture according to an embodiment. As shown in FIG. 6, the system is similar to the above system described in FIG. 1, and includes a search client 10, a search service subsystem 20C, and at least one member engine. The search client 10 is configured to send a search request to the search service subsystem. The at least one member engine is configured to provide a meta index of the member engine to the search service subsystem, and receive the search request sent from the search service subsystem, so as to complete searching.

The search service subsystem 20C as shown in FIG. 6 includes a search server 201C, a scheduling server 203C, and a user database 202, where the user database 202 is configured to store or provide user personalized data;

the search server 201C is configured to receive the search request sent from the search client, send the search request to the scheduling server, receive a member engine selected and returned by the scheduling server, and send the search request to the selected member engine; and the scheduling server 203C is configured to receive the search request sent from the search server, extract a user interest model from the user personalized data according to the search request, and obtain the meta index of each member engine; select a member engine according to the meta index of each member engine, the search request, and the user interest model; and return the selected member engine to the search server.

Figure 7:
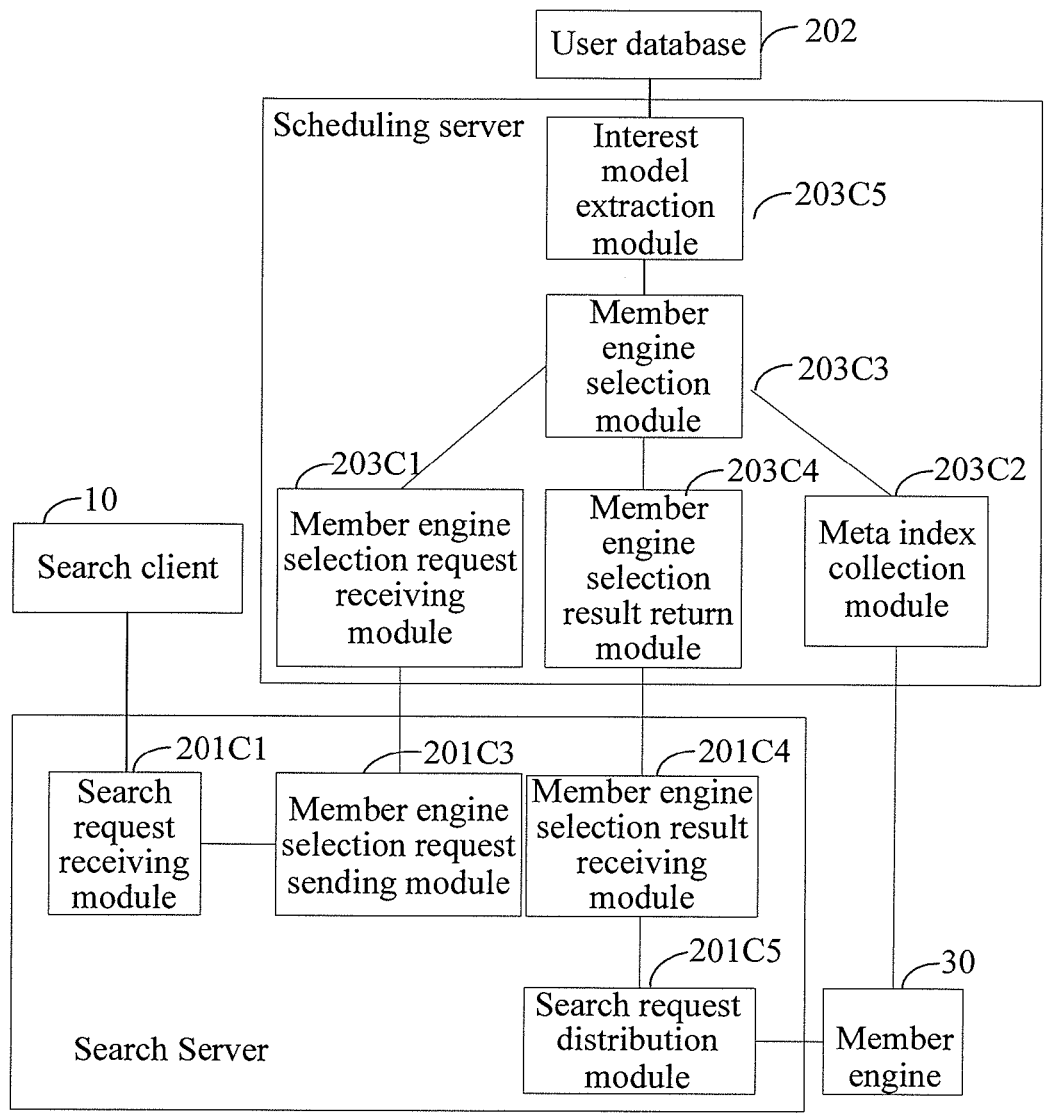
FIG. 7 is a schematic structural view of a device under the system architecture as shown in FIG. 6.

FIG. 7 is a schematic structural view of the search server 201C and the scheduling server 203C under the system architecture as shown in FIG. 6.

As shown in FIG. 7, the search server 201C includes:

a search request receiving module 201C1, configured to receive a search request sent from a search client, and send the search request to a member engine selection request sending module 201C3;

a member engine selection request sending module 201C3, configured to send the search request to the scheduling server, so as to enable the scheduling server to select a member engine according to a meta index of each member engine, the search request, and a user interest model;

a member engine selection result receiving module 201C4, configured to receive the member engine selected and returned by the scheduling server; and a search request distribution module 201C5, configured to send the search request to the selected member engine, so as to enable the selected member engine to complete searching according to the search request.

As shown in FIG. 7, the scheduling server 203C may communicate with the above search server 201C, and includes:

a member engine selection request receiving module 203C1, configured to receive the search request sent from the search server;

a user interest model extraction module 203C5, configured to extract the user interest model from user personalized data according to the received search request, and send the user interest model to a member engine selection module 203C3;

a meta index collection module 203C2, configured to obtain the meta index of each member engine;

a member engine selection module 203C3, configured to select the member engine according to the meta index of each member engine, the search request, and the user interest model; and a member engine selection result return module 203C4, configured to send the selected member engine to the search server, so as to enable the search server to send the search request to the selected member engine, and enable the selected member engine to complete searching according to the search request.

The device embodiments are merely exemplary. Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands. Persons of ordinary skill in the art can understand and implement the present invention without creative efforts.

According to the above search systems and devices, the member engine is selected according to the meta index of each member engine, the search request, and the user interest model, and then the searching is performed by the selected member engine, so as to further improve the search precision and the search efficiency.

The work flows of the above search system, and the devices such as the search server, and the scheduling server are similar to a search method described in detail below.

Figure 8:
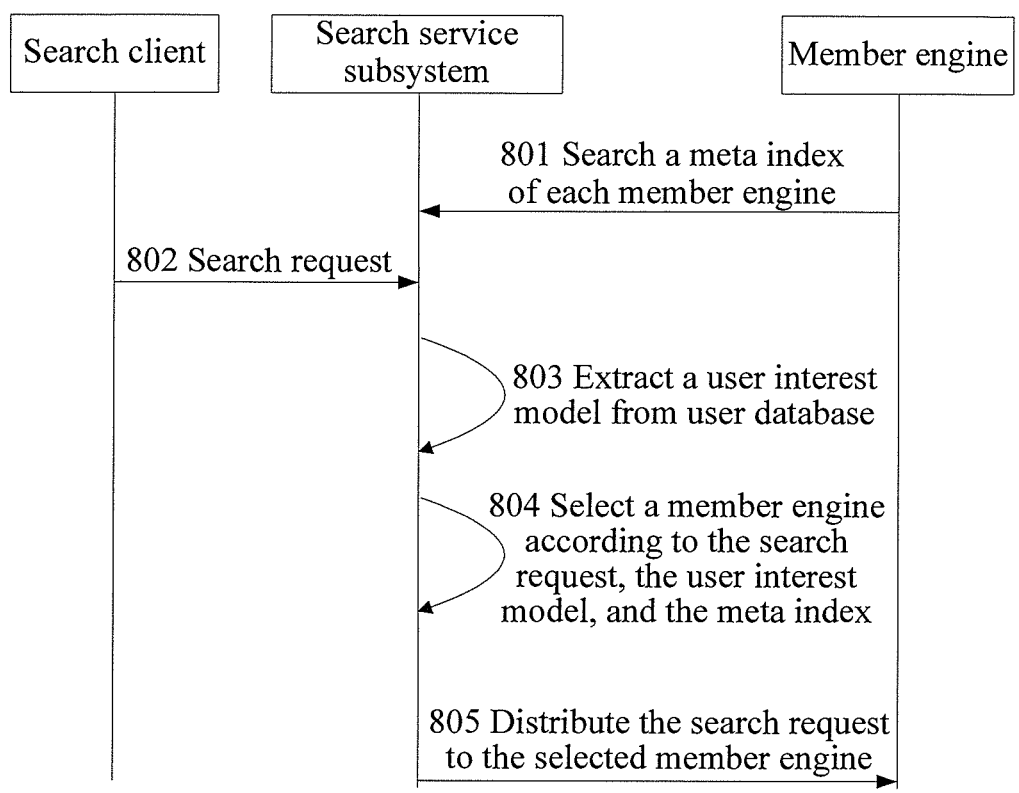
FIG. 8 is a schematic flowchart of a search method embodiment of the present invention.

FIG. 8 is a schematic flow chart of a search method embodiment. As shown in FIG. 8, the method includes the following steps.

In step 801, a search service subsystem receives a meta index of each member engine.

The step may be specifically that each member engine reports the meta index of respective member engine to the search service subsystem. Each member engine, is corresponding to a database, where the database may include several sub-databases, and the meta index of the member engine is determined specifically by data in the database or the sub-databases corresponding to the member engine. The meta index includes statistical data of a term in the data, or statistical data of an interest model of a document in the data. The interest model of the document is a vector composed of weigh scores relative to certain dimensions which are extracted from data in the document. In a specific embodiment of the present invention, the above interest model of the document should have a dimension number the same as that of the above user interest model.

Specifically, the meta index may include one of the information below or any combination thereof.

(1) Maximum normalized weight vector mnw=(mnw1, mnw2, ..., mnwi, ... mnwp) of term, where mnwi is a maximum normalized weight of a term ti relative to all documents in a database or sub-database corresponding to the member engine.

mnwi may be calculated in this way: first calculating weights of the term ti relative to each document in the database, where a value of the weight is an occurrence number of the term in a document, then taking a maximal value from the weights of the term ti relative to all the documents to obtain a maximal weight mnwi' of the term ti relative to all the documents in the database, and then normalizing a vector mnw' (mnw1', mnw2', ... mnwi', ..., mnwp'), so as to finally obtain the normalized vector mnw (mnw1, mnw2, ..., mnwi, ..., mnwp) of the vector mnw'.

(2) Average normalized weight vector anw=(anw1, anw2, ..., anwi ..., anwp) of term, where anwi is an average normalized weight of a term ti relative to all documents in a database or sub-database corresponding to the member engine.

anwi may be calculated in this way: first calculating weights of the term ti relative to each document in the database, where the value of the weight is the occurrence number of the term in the document, then taking an average value from the weights of the term ti relative to all the documents to obtain an average weight anwi' of the term ti relative to all the documents in the database, and then normalizing a vector anw' (anw1', anw2' ... anwi', ..., anwp'), so as to finally obtain the normalized vector anw (anw1, anw2, ..., anwi, anwp) of the vector anw'.

(3) Maximum normalized weight vector mnv=(mnv1, mnv2, ..., mnvi, ..., mnvn) of an interest model of a document in a database or sub-database, where mnvi is maximum normalized weight of the $i^{th}$ dimension of the interest model of the document relative to all the documents in the database or sub-database corresponding to the member engine.

mnvi may be calculated in this way: first calculating weights of the $i^{th}$ dimension of the interest model relative to each document in the database, where the value of the weight is the sum of the frequency of all words belonging to the $i^{th}$ dimension (for example, sports) of the interest model in the document; then taking a maximal value from the weights of the $i^{th}$ dimension of the interest model relative to all the documents to obtain a maximal weight mnvi' of the $i^{th}$ dimension of the interest model relative to all the documents in the database D, and then normalizing a vector mnv' (mnv1', mnv2' ... mnvi', ..., mnvp'), so as to finally obtain the normalized vector mnv (mnv1, mnv2, ..., mnvi, ..., mnvp) of the vector mnv'.

(4) Average normalized weight vector anv=(anv1, anv2, ..., anvi, ..., anvn) of an interest model of a document in a database or sub-database, where anvi is an average normalized weight of the $i^{th}$ dimension of the interest model of the document relative to all the documents in the database corresponding to the member engine.

anvi may be calculated in this way: first calculating weights of the $i^{th}$ dimension of the interest model relative to each document in the database, where the value of the weight is the sum of the frequency of all words belonging to the $i^{th}$ dimension (for example, sports) of the interest model in the document; then averaging the weights of the $i^{th}$ dimension of the interest model relative to all the documents to obtain an average weight anvi' of the $i^{th}$ dimension of the interest model relative to all the documents in the database, and then normalizing a vector anv'(anv1', anv2' ... anvi', ..., anvp'), so as to finally obtain the normalized vector anv (anv1, anv2, ..., anvi, ..., anvp) of the vector anv'.

(5) Global inverse document frequency (gidfi) of a term ti relative to a database, where gidfi=1/dfi, dfi is the number of documents containing the term ti in the database corresponding to the meta index.

(6) Global inverse document frequency IM_gidfi corresponding to the $i^{th}$ dimension of an interest model of a document, where IM_gidfi=1/IM_IDFi, and IM_IDFi is the number of documents containing one or more terms belonging to the $i^{th}$ dimension of the interest model of the document in a database or sub-database.

In step 802, the search service subsystem receives a search request sent from a search client.

Generally, the search request carries information such as a user ID, and search key words containing one or more terms. Hereinafter, Q=(q1, q2, ... qi ... qk) may be used to denote a vector corresponding to the search request, and i, where qi is a weight of a term ti in the search request, and k are a natural number.

In step 803, the search service subsystem extracts a user interest model from a user database.

Specifically, the user database generally stores user personalized data, including, for example, user static profile, search history, exhibition information, and location information. As for different data, specifically, different methods may be used to extract the user interest model, which are described in detail below.

In step 804, a member engine is selected according to the search request, the user interest model, and the meta index.

Specifically, in the selection, the factors such as the meta index and the user interest model as well as the search request, are considered, and the specific selection process is described in detail below.

In step 805, the search request is distributed to the selected member engine.

Figure 9:
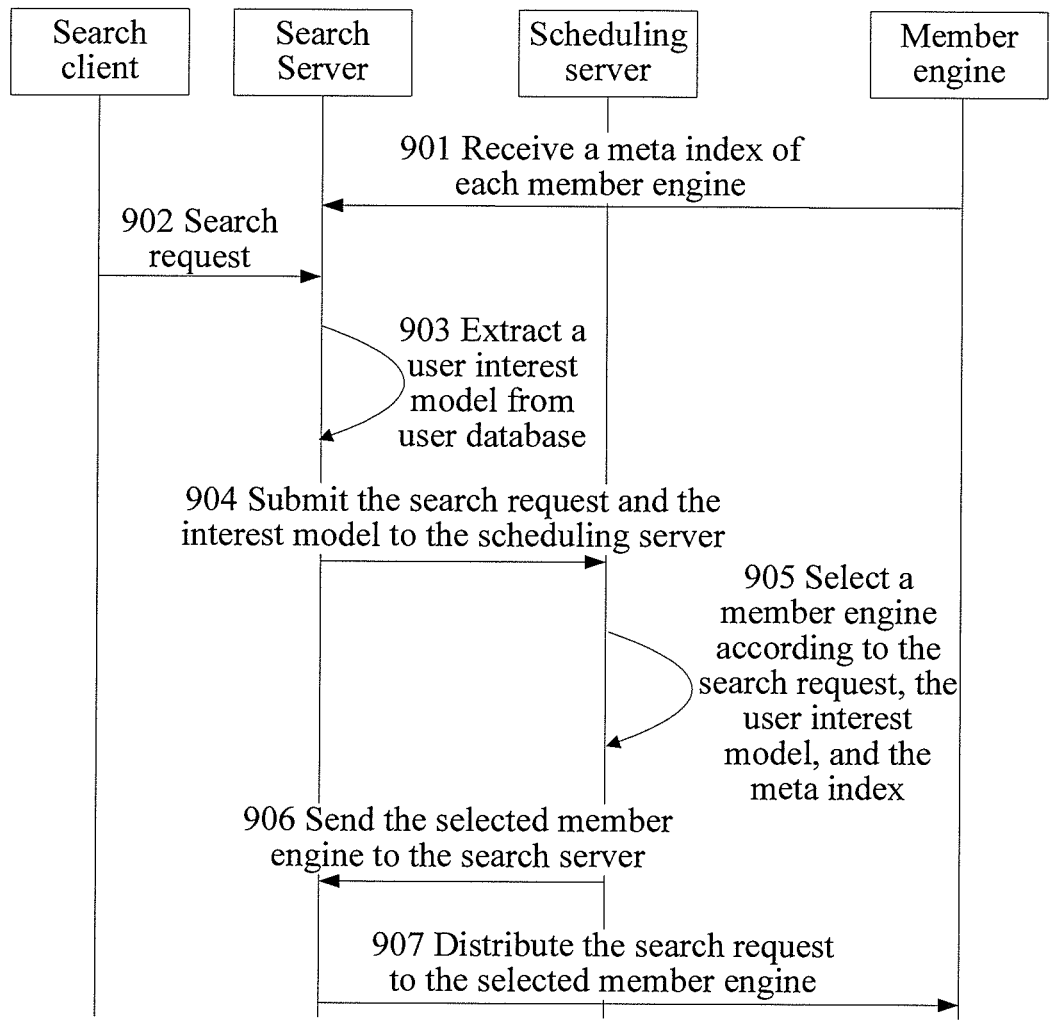
FIG. 9 is a schematic flow chart of another search method embodiment of the present invention.

FIG. 9 is a schematic flow chart of another search method. As shown in FIG. 9, the method includes the following steps.

In step 901, a scheduling server receives a meta index of each member engine.

Specifically, the step may be that each member engine reports the meta index of respective member engine to the scheduling server.

In step 902, a search server receives a search request sent from a search client.

Generally, the search request carries information such as a user ID, and search key words containing one or more terms.

It can be seen that the above steps 901 and 902 may be performed regardless of time sequence.

In step 903, after receiving the search request, the search server extracts a user interest model from user personalized data in a user database.

In step 904, the search server submits the search request and the user interest model to the scheduling server.

In step 905, the scheduling server selects a member engine according to the search request, the user interest model, and the meta index.

In step 906, the scheduling server sends the selected member engine to the search server.

In step 907, the search server sends the search request to the selected member engine, so as to enable the member engine to complete searching.

Figure 10:
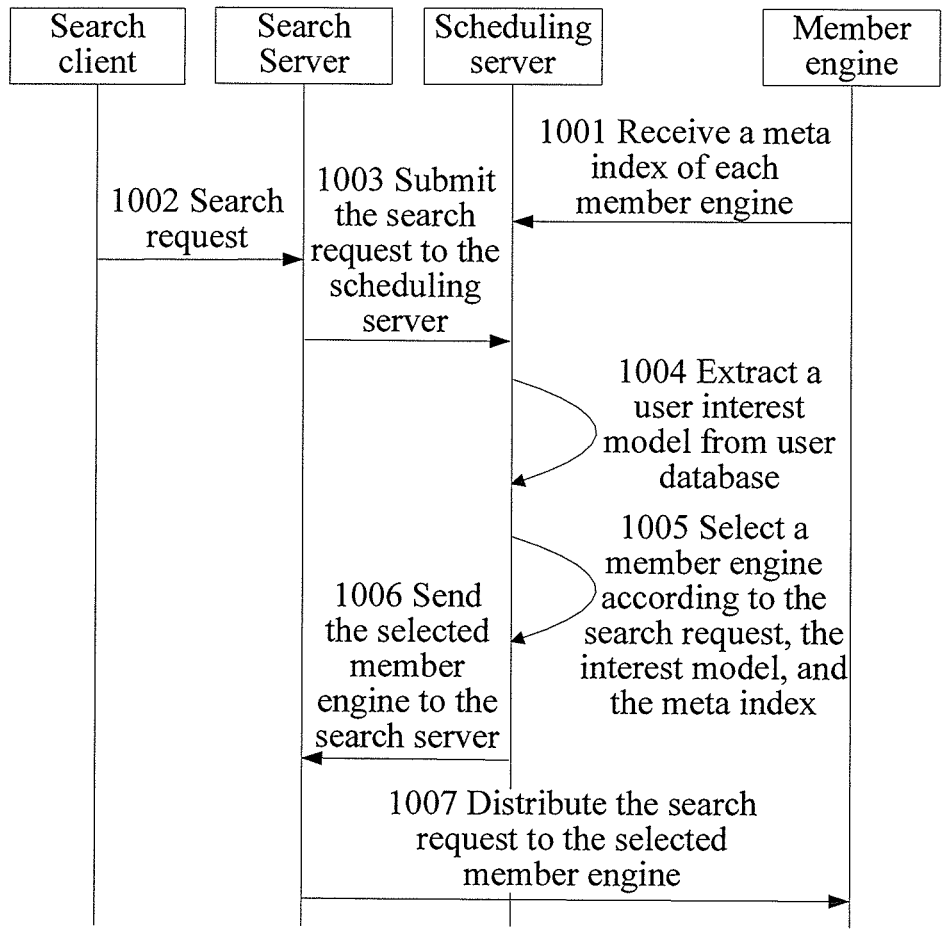
FIG. 10 is a schematic flow chart of still another search method embodiment of the present invention.

As shown in FIG. 10, another similar search method includes the following steps.

In step 1001, a scheduling server receives a meta index of each member engine.

The step may be specifically that each member engine reports the meta index of respective member engine to the scheduling server.

In step 1002, a search client sends a search request to a search server.

Generally, the search request carries information such as a user ID, and search key words containing one or more terms.

It can be seen that the above steps 1001 and 1002 may be performed regardless of time sequence.

In step 1003, after receiving the search request, the search server sends the search request to the scheduling server.

In step 1004, after receiving the search request, the scheduling server extracts a user interest model from user personalized data in a user database.

In step 1005, the scheduling server selects a member engine according to the search request, the user interest model, and the meta index.

In step 1006, the scheduling server returns the selected member engine to the search server.

In step 1007, after receiving the selected member engine, the search server distributes the search request to the selected member engine.

Hereinafter, the specific method for extracting the user interest model from the user personalized data in the user database in the above step 803, 903 or 1004 are specifically described.

Figure 11:
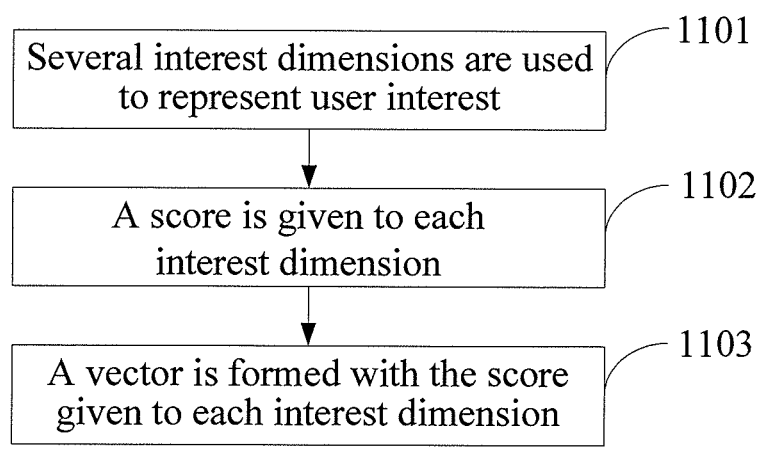
FIG. 11 is a schematic flow chart of a process for extracting a user interest model of the present invention.

As shown in FIG. 11, a method for extracting the user interest model from the user personalized data includes the following steps.

In step 1101, several interest dimensions are used to represent user interest.

The interest dimensions include, for example, news, sports, entertainment, finance and economics, science and technology, house property, games, woman, forum, weather, goods, home appliances, music, reading, blog, cell phone, military affairs, education, travel, multimedia message, color ring back tone, food & beverage, civil aviation, industry, agriculture, computer, and geography, but is not limited in practical implementation process.

In step 1102, a score is given to each interest dimension.

In step 1103, a vector is formed with the score given to each interest dimension, and the vector is the user interest model.

The user interest model may be expressed as $R=(r_1, r_2, \ldots r_i \ldots, r_n)$, where n represents n dimensions, $r_i$ is a weigh score of the $i^{th}$ dimension in the interest model, and i is a natural number.

Figure 12:
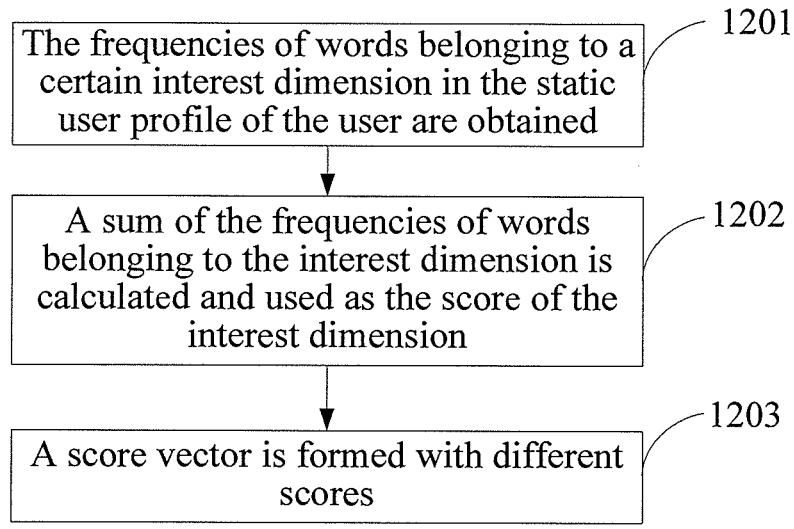
FIG. 12 is a schematic flow chart of a process for extracting a user static-interest model of the present invention.

Specifically, the user personalized data may be user static profile of a user, and thus the obtained user interest model may be called as user static interest model. Referring to FIG. 12, the method specifically includes the following steps.

In step 1201, the frequencies of words belonging to a certain interest dimension in the static user profile of the user are obtained.

In step 1202, a sum of the frequencies of words belonging to the interest dimension is calculated and used as the score of the interest dimension.

In step 1203, a score vector is formed with different scores, and the score vector is the static interest model of the user.

The static interest model of the user may be expressed as interest model $R1=(p_1, p_2, p_3, \ldots, p_i)$ corresponding to the static user profile of the user, where $p_i$ represents the sum of the frequencies of all words belonging to the $i^{th}$ interest dimension in the static user profile, and i is a natural number.

Figure 13:
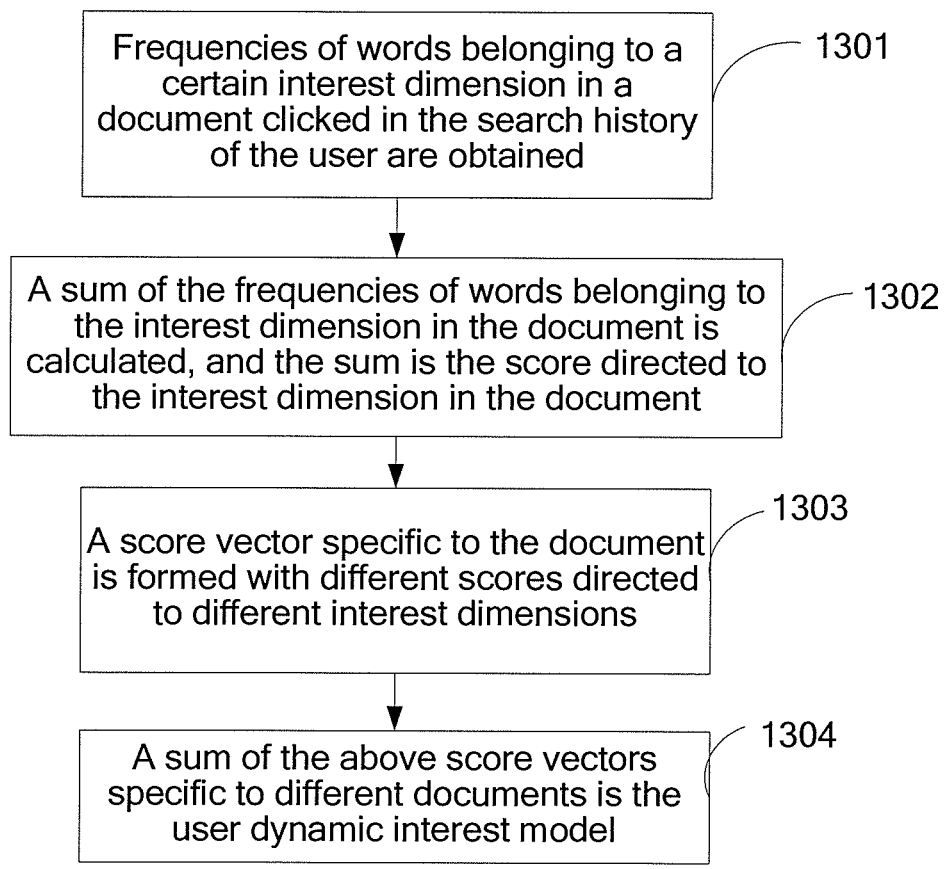
FIG. 13 is a schematic flow chart of a process for extracting a user dynamic-interest model of the present invention.

Specifically, the user personalized data may also be the search history of a user, and thus the obtained user interest model may be called as user dynamic interest model. As shown in FIG. 13, the method may specifically include the following steps.

In step 1301, frequencies of words belonging to a certain interest dimension in a document clicked in the search history of the user are obtained.

In step 1302, a sum of the frequencies of words belonging to the interest dimension in the document is calculated, and the sum is the score specific to the interest dimension in the document.

In step 1303, a score vector specific to the document is formed with different scores specific to different interest dimensions.

In step 1304, a sum of the above score vectors specific to the document clicked in different search histories is the user dynamic interest model.

The user dynamic interest model may be expressed as interest model $R2=d_1+d_2+d_3+ \ldots d_i$ corresponding to the search and click histories of the users, where $d_i=(t_1, t_2, t_3, \ldots, t_j)$, $d_i$ is an interest model vector corresponding to a certain document i clicked by a user when the user clicks the document i, $t_j$ is the sum of the frequencies of all words belonging to the $j^{th}$ interest dimension in the document i, and i and j are natural numbers.

When the user personalized data is a search history, in a specific embodiment, the user interest model may be further modified by the following steps, based on the specific circumstance.

When the evaluation on the clicked document by the user is good, the score vector specific to the document is forwardly weighed.

The step may be expressed as $d_i=c*d_i=(c*t_i, c*t_2, c*t_3, \ldots, c*t_n)$, that is, if the evaluation on the clicked document i is good, the vector $d_i$ is multiplied by a constant c, indicating that the importance of the document is increased.

Alternatively, when the evaluation on the clicked document by the user is not good, the score vector specific to the document is inversely weighed.

The step may be expressed as $d_i=1/c*d_i=(1/c*t_i, 1/c*t_2, 1/c*t_3, \ldots, 1/c*t_n)$, that is, if the evaluation on the clicked document i is not good, the vector $d_i$ is multiplied by a reciprocal of a positive constant c, indicating that the importance of the document is decreased.

The score vector specific to the document is descended with the time lapsed after the document is clicked.

For example, after a period of time, the value of $t_j$ is automatically reduced by a certain percentage, indicating that the importance is lowered with the lapsing of time, till the value of $t_j$ is reduced to zero after a long period of time, then $d_i$ is deleted from the search history of the user. For example, the value of $t_j$ is reduced by 10% every month after clicking, and reduced to zero after 10 consecutive months after clicking, if there is no new click.

In an implementation process, the user personalized data may include both the static user profile of the user and the search history of the user, in this case, the obtained user interest model may be called as user composite interest model. Therefore, the method for extracting the user interest model may also includes the following steps.

The static interest model, and the dynamic interest model are respectively normalized, and a sum of the normalized static interest model and dynamic interest model is used as the composite interest model.

Alternatively, weighted summing of the static interest model and the dynamic interest model is performed, and then the sum is normalized, so as to use the normalized result as the composite interest model.

A specific process for selecting the member engine according to the search request, the user interest model and the meta index in the above step 804, 905, or 1005 is specifically described.

Figure 14:
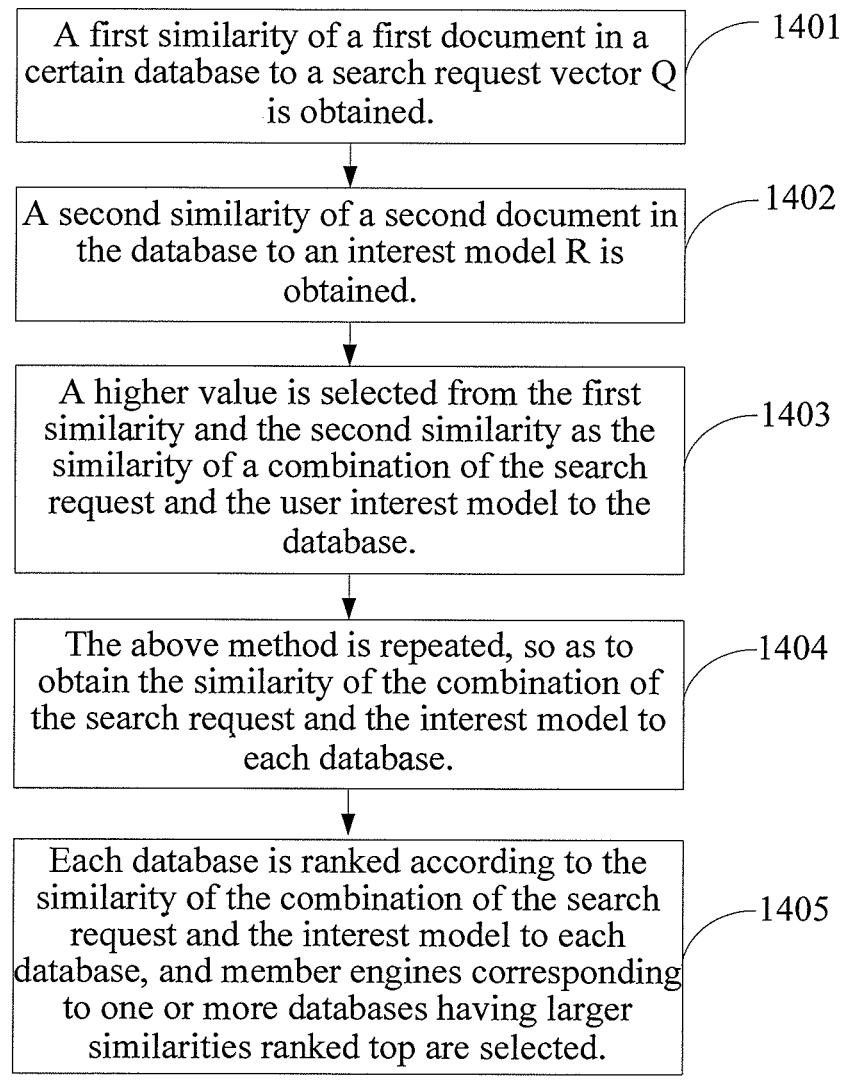
FIG. 14 is a schematic flow chart of a process for selecting a member engine of the present invention.

As shown in FIG. 14, the selection process specifically includes the following steps.

In step 1401, a first similarity of a first document in a certain database to a search request vector Q is obtained, where the first document satisfies a condition that the similarity to the search request vector Q is the highest; and the search request vector $Q=(q1, q2, \ldots qi \ldots qk)$, where qi is a weight of a term ti in the search request.

In step 1402, a second similarity of a second document in the database to a user interest model R is obtained, where the second document satisfies a condition that the similarity to the user interest model vector R is the highest while the matching degree with a vector $Q'$ $(q1', q2' \ldots qm')$ meets a specified threshold value, where the vector $Q'$ is a conversion form of the search request vector Q specific to the user interest model vector R, the user interest model vector $R=(r1, r2, \ldots ri \ldots, rn)$, and ri is a weight score of the $i^{th}$ dimension of the user interest model.

In step 1403, a higher value is selected from the first similarity and the second similarity as the similarity of a combination of the search request and the user interest model to the database.

In step 1404, the above method is repeated, so as to obtain the similarity of the combination of the search request and the user interest model to each database, where each database is corresponding to a member engine.

In step 1405, each database is ranked according to the similarity of the combination of the search request and the user interest model to each database, and member engines corresponding to one or more databases having larger similarities ranked top are selected.

Specifically, the processes for obtaining the first similarity and the second similarity in the above steps 1401 and 1402 may include different steps (that is, use different formulas and algorithms), and are described below with reference to specific examples.

In one case, in step 1401*a*, a value of $$\max_{1 \le i \le k} \left( \left( qi * gidfi * mnwi + \sum_{j=1, j \ne i}^{k} qj * gidfj * anwj \right) \Big/ |Q| + \sum_{j=1}^{n} rj * anvj / |R| \right)$$

is calculated as the first similarity, where $|Q|$ is a norm of the search request vector Q, $|R|$ is a norm of the user interest model R.

In step 1402*a*, a value of $$\max_{1 \le i \le n} \left( \text{if } (sim(V(mnvi, anvj(j \ne i, 1 \le j \le n)), Q') > T) \text{then} \right.$$
$$\left. \left( \left( ri * mnvi + \sum_{j=1, j \ne i}^{n} rj * anvj \right) \Big/ |R| + \sum_{i=1}^{k} qi * gidfi * anwi / |Q| \right) \right)$$

is calculated and used as the second similarity.

$Q'$ is calculated as follows: if the term ti belongs to the scope of a certain dimension in the user interest model, a value of qi is mapped into weight of the dimension in the user interest model, then the weights of the same dimension are added to obtain qi', and then qi' is normalized; V is a vector formed with mnvi and anvj $(j \ne i, 1 \le j \le n)$; $sim(V(mnvi, anvj(j \ne i, 1 \le j \le n)), Q')$ is a cosine similarity of the vector V and the vector $Q'$; T is a threshold value, and $0 < T \le 1$; and i, k, j, and n are natural numbers.

In another case, in step 1401*b*, a value of $$\max_{1 \le i \le k} \left( \left( qi * gidfi * mnwi + \sum_{j=1, j \ne i}^{k} qj * gidfj * anwj \right) \Big/ |Q| + \sum_{j=1}^{n} rj * anvj * \text{IM\_gidfj} / |R| \right)$$

is calculated and used as the first similarity, where $|Q|$ is a norm of the search request vector Q, $|R|$ is a norm of the user interest model R.

In step 1402*b*, a value of $$\max_{1 \le i \le n} (\text{if } (sim(V(\text{IM\_gidfi}*mnvi, \text{IM\_gidfj}*anvj(j \ne i, 1 \le j \le n)), Q') > T)$$
$$\text{then} \left( \left( ri * mnvi * \text{IM\_gidfi} + \sum_{j=1, j \ne i}^{n} rj * anvj * \text{IM\_gidfj} \right) \Big/ |R| + \sum_{i=1}^{k} qi * gidfi * anwi \right) \Big/ |Q| \right)$$

is calculated, and used as the second similarity.

$Q'$ is calculated as follows: if the term ti belongs to the scope of a certain dimension in the user interest model, value of qi is mapped into weight of the dimension in the user interest model, then the weights of the same dimension are added to obtain qi', and then qi' is normalized; V is a vector formed with IM_gidfi*mnvi and IM_gidfj*anvj$(j \ne i, 1 \le j \le n)$; $sim(V(\text{IM\_gidfi}*mnvi, \text{IM\_gidfi}*anvj (j \ne i, 1 \le j \le n)), Q')$ is a cosine similarity of the vector V and the vector $Q'$; and T is a threshold value and $0 < T \le 1$.

In another case, in step 1401*c*, a value of $$\max_{1 \le i \le k} \left( \left( qi * gidfi * mnwi + \sum_{j=1, j \ne i}^{k} qj * gidfj * anwj \right) \Big/ |Q| + \sum_{j=1}^{n} rj * anvj * \text{IM\_gidfj} / |R| \right)$$

is calculated and used as the first similarity, where $|Q|$ is a norm of the search request vector Q, and $|R|$ is a norm of the user interest model R.

In step 1402*c*, a value of $$\max_{1 \le i \le n} \left( \text{if } (sim(V(mnvi, anvj(j \ne i, 1 \le j \le n)), Q') > T) \right.$$

-continued $$\text{then}\left(\left(ri*mnvi*\text{IM\_gidfi}+\sum_{j=1,j\neq i}^{n}rj*anvj*\text{IM\_gidfj}\right)\middle/|R|+\right.$$

$$\left.\sum_{i=1}^{k}qi*gidfi*anwi\right)\middle/|Q|\right)$$

is calculated, and used as the second similarity.

Q' is calculated as follows: if the term ti belongs to the scope of a certain dimension in the user interest model, a value of qi is mapped into weight of the dimension in the user interest model, then the weights of the same dimension are added to obtain qi', and then qi' is normalized; V is a vector formed with mnvi and anvj (j≠i,1≦j≦n) sim(V(mnvi,anvj (j≠i,1≦j≦n)), Q') is a cosine similarity of the vector V and the vector Q'; and T is a threshold value, and 0<T≦1.

Through the calculation and selection in the above steps 1401 to 1405, the similarity of the database corresponding to the selected member engine database to the combination of the search request and the user interest model is high, and thus the search precision can be improved, and the resources of the search system is saved, thereby improving the search efficiency.

Through the above description of the implementation, it is clear to persons skilled in the art that each embodiment may be accomplished through hardware, or through software plus a necessary universal hardware platform. Based on this, the above technical solution or the part that makes contributions to the prior art can be substantially embodied in the form of a software product. The computer software product may be stored in a computer readable storage medium such as a ROM/RAM, a magnetic disk or an optical disk, and contain several instructions to instruct computer equipment (for example, a personal computer, a server, or network equipment) to perform the method described in the embodiments of the present invention or in some parts of the embodiments.

In the above embodiments, personalization selection of the member engine is performed by fully using rich user data, so that a member engine best meeting the demands of the user personalized interest is selected to serve users, and the selection and scheduling of the member engine are accurate, thereby achieving the purpose of precise search.

The above embodiments are not intended to limit the scope of the technical solution. Any modification, equivalent replacement, and improvement made without departing from the spirit and principle of the above embodiments shall fall within the protection scope of the technical solution.

Another embodiment of the present invention is similar to the above embodiments, except the information contained in the meta index:

global inverse document frequency of a term ti relative to a database may be replaced by gidfi=log(n/(gdfi+1)), where gdfi is sum of the number of the documents containing the term ti in the databases or sub-databases corresponding to all member engines, and n is the sum of the number of the documents contained in all member engines; and global inverse document frequency corresponding to the $i^{th}$ dimension of an interest model of a document may be replaced by IM_gidfi=log(n/(IM_gdfi+1)), where IM_gdfi is the sum of the number of documents containing terms belonging to the $i^{th}$ dimension of the interest model of the document in the databases or sub-databases corresponding to all member engines, and n is the sum of the number of all the documents contained in all member engines.

Figure 15:
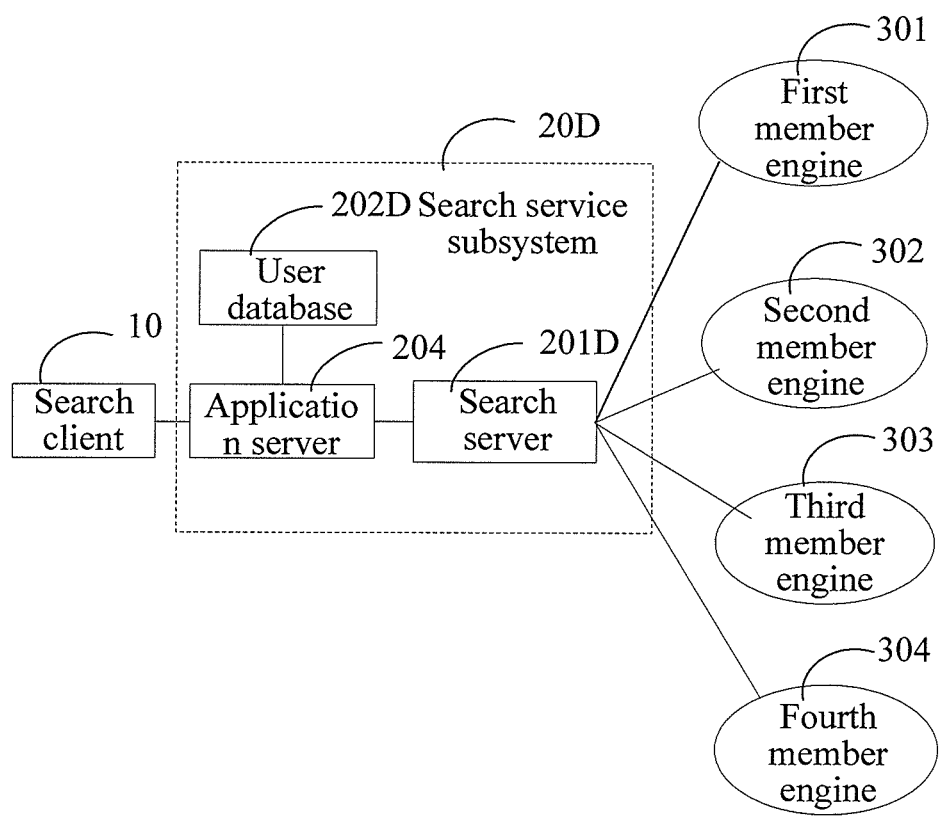
FIG. 15 is a schematic view of another search system architecture according to an embodiment of the present invention.

FIG. 15 is a schematic view of a search system architecture according to an embodiment of the present invention. Similar to the system described in FIG. 1 above, the system includes a search client 10, a search service subsystem 20D, and at least one member engine 301, 302, or 303. The search client 10 is configured to send a search request to the search service subsystem 20D; and the at least one member engine 301, 302, or 303 is configured to provide a meta index of the member engine to the search service subsystem 20D, and complete searching after receiving the search request sent from the search service subsystem 20D.

As shown in FIG. 15, the search service subsystem 20D includes a search server 201D, an application server 204, and a user database 202D.

The user database 202D is configured to store or provide user personalized data.

The application server 204 is configured to receive the search request sent from the search client 10, extract a user interest model from the user personalized data according to the search request; and send the search request and the user interest model to the search server 201D.

The search server 201D is configured to receive the search request and the user interest model sent from the application server 204, receive the meta index reported by each member engine 301, 302, or 303, and select the member engine 301, 302, or 303 according to the meta index of each member engine 301, 302, or 303, the search request, and the user interest model; and send the search request to the selected member engine 301, 302, or 303.

Figure 16:
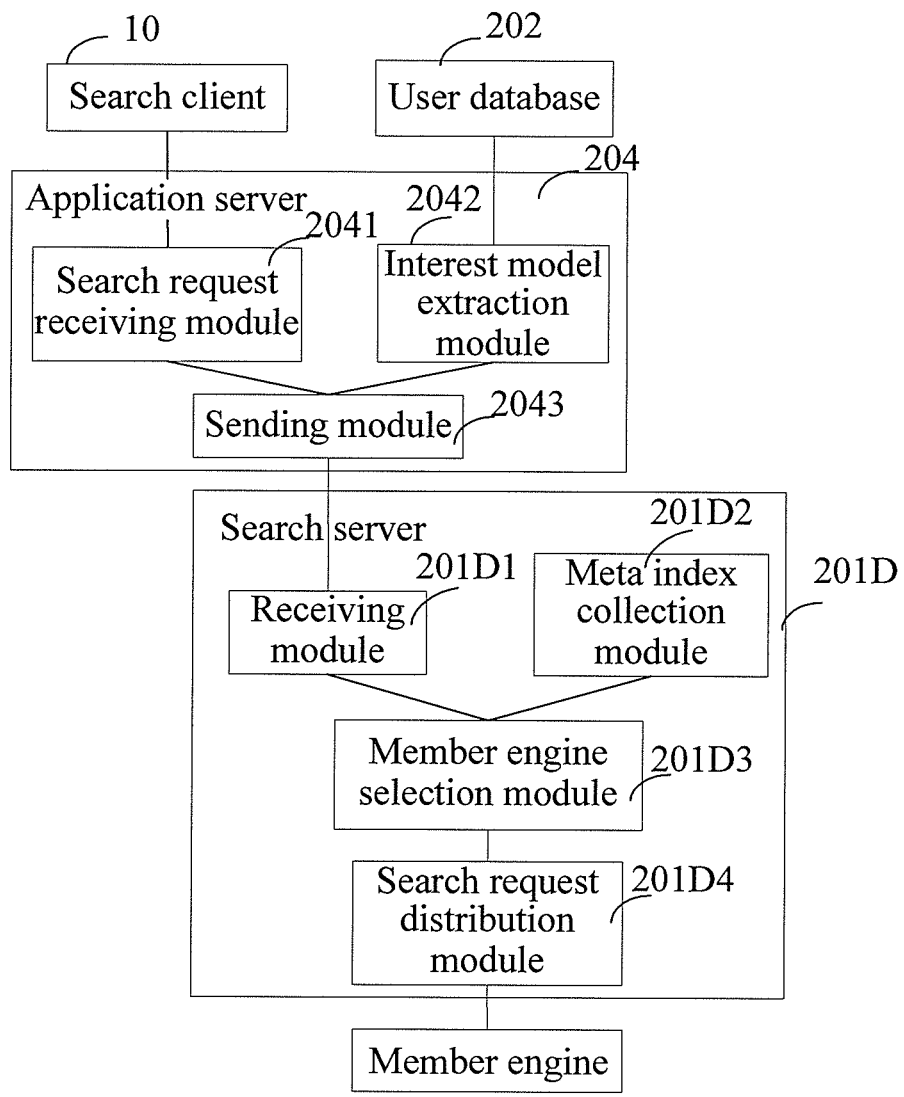
FIG. 16 is a structural view of a search server and an application server under the search system architecture as shown in FIG. 15.

FIG. 16 is a structural view of the search server 210D and the application server 204 under the search system architecture as shown in FIG. 15.

The application server 204 includes a search request receiving module 2041, an interest model extraction module 2042, and a sending module 2043. The search request receiving module 2041 is configured to receive the search request sent from the search client. The interest model extraction module 2042 is configured to extract the user interest model from the user personalized data according to the search request. Likewise, the user interest model may be extracted from the user personalized data after the search request is received, or extracted from the user personalized data in advance, and the user interest model extracted in advance is obtained directly after the search request is received. The sending module 2043 is configured to send the search request and the user interest model to the search server 201D.

The search server 201D includes a receiving module 201D1, a meta index collection module 201D2, a member engine selection module 201D3, and a search request distribution module 201D4. The receiving module 201D1 is configured to receive the search request and the user interest model sent from the application server. The meta index collection module 201D2 is configured to receive the meta index reported by each member engine. The member engine selection module 201D3 is configured to select a member engine according to the meta index of each member engine, the search request, and the user interest model. The search request distribution module 201D4 is configured to send the search request to the selected member engine, so as to enable the selected member engine to complete searching according to the search request.

Figure 17:
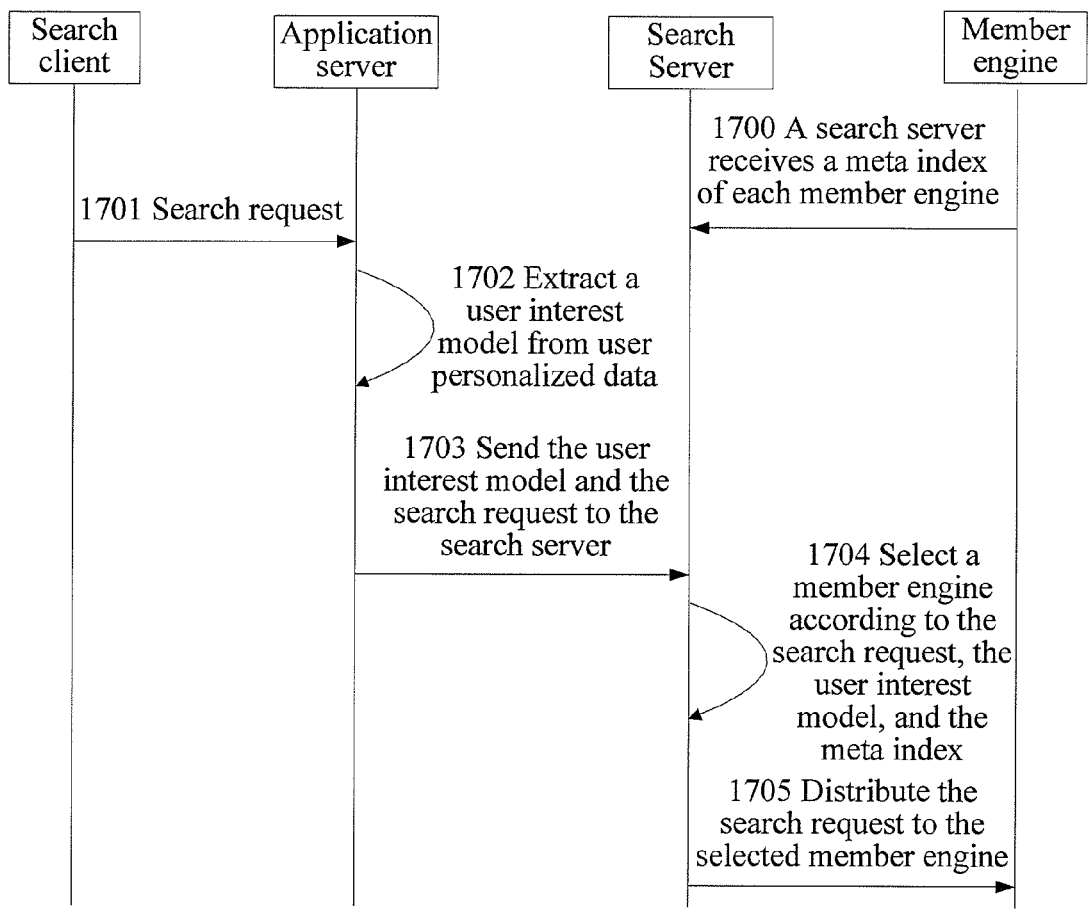
FIG. 17 is a working flow chart of a search system as shown in FIG. 15.

FIG. 17 is a working flow chart of a search system as shown in FIG. 15. The search method includes the following steps.

In step 1700, a search server receives a meta index of each member engine.

The step may be specifically that each member engine actively reports the meta index of respective member engine to the search server, or the search server request the meta index of the member engine from each member engine.

In step 1701, an application server receives a search request sent from a search client.

In step 1702, the application server extracts a user interest model from user personalized data.

Specifically, the user interest model may be extracted from the user personalized data after the search request is received, or extracted from the user personalized data in advance, and the user interest model extracted in advance is obtained directly after the search request is received.

In step 1703, the user interest model and the search request are sent to the search server.

In step 1704, a member engine is selected according to the search request, the user interest model, and the meta index.

Specifically, a similarity of a combination of the search request and the interest model to a database corresponding to a member engine is calculated according to the search request, the interest model, and the meta index, and the member engine of high similarity is selected. Reference may be made to the above specific embodiments for the specific selection method.

In step 1705, the search request is sent to the selected member engine, so as to enable the selected member engine to complete searching.

It should be understood by persons skilled in the art that, a part or all modules in the above system and server embodiments can be in integrated or dispersed arrangement. For example, the functions of the search service subsystem may be implemented by the search server, the scheduling server, or the application server, or integrated in a server. The user database may exist independently, or integrated in any server above. The different modules in the above search server, scheduling server, or application server may also integrated together in any combination thereof.

In addition, it should be understood by persons skilled in the art that, in the above method, system, and server embodiments, the extracting the user interest model from the user personalized data according to the search request may include different cases in which the user interest model is extracted from the user personalized data after the search request is received; or the user interest model is extracted from the user interest model in advance, and the user interest model extracted from the user personalized data in advance is directly obtained after the search request is received.

It should be understood by persons skilled in the art that the user interest model in the embodiments of the present invention may be replaced by equivalent user personalized data of other types. The user interest model may be an expression form of the user personalized data, but the protection scope of the present invention is definitely not limited thereto. It should be further understood by persons skilled in the art that, as for the selection of the member engine according to the meta index of each member engine, the search request, and the personalized data in the embodiments of the present invention, in practical application, some considerations may be added in selecting the member engine, or the selected member engine is further processed by, for example, integration and filtering, and then the search is performed by the finally determined member engine.

Based on the descriptions for the above embodiments, it is known that the present invention includes the following specific embodiments.

A search server is provided, which includes:
a search request receiving module, configured to receive a search request sent from a search client;

an interest model extraction module, configured to extract a user interest model from user personalized data according to the search request;

a meta index collection module, configured to receive a meta index reported by each member engine;

a member engine selection module, configured to select a member engine according to the meta index of each member engine, the search request, and the user interest model; and a search request distribution module, configured to send the search request to the selected member engine, so as to enable the selected member engine to complete searching according to the search request.

A search server is provided, which includes:
a search request receiving module, configured to receive a search request sent from a search client, and send the search request to a member engine selection request sending module;

an interest model extraction module, configured to extract a user interest model from user personalized data according to the search request, and send the user interest model to the member engine selection request sending module;

the member engine selection request sending module, configured to send the search request and the user interest model to a scheduling server, so as to enable the scheduling server to select a member engine according to a meta index of each member engine, the search request, and the user interest model;

a member engine selection result receiving module, configured to receive the member engine selected and returned by the scheduling server; and a search request distribution module, configured to send the search request to the selected member engine, so as to enable the selected member engine to complete searching according to the search request.

A scheduling server is provided, which can communicate with the search server, and includes:
a member engine selection request receiving module, configured to receive a search request and a user interest model sent from the search server;

a meta index collection module, configured to receive a meta index reported by each member engine;

a member engine selection module, configured to select a member engine according to the meta index of each member engine, the search request, and the user interest model; and a member engine selection result return module, configured to send the selected member engine to the search server, so as to enable the search server to send the search request to the selected member engine, and enable the selected member engine to complete searching according to the search request.

A search server is provided, which includes:
a search request receiving module, configured to receive a search request sent from a search client, and send the search request to a member engine selection request sending module;

the member engine selection request sending module, configured to send the search request to a scheduling server, so as to enable the scheduling server to select a member engine according to a meta index of each member engine, the search request, and the user interest model;

a member engine selection result receiving module, configured to receive the member engine selected and returned by the scheduling server; and a search request distribution module, configured to send the search request to the selected member engine, so as to enable the selected member engine to complete searching according to the search request.

A scheduling server is provided, which can communicate with the search server, and includes:

a member engine selection request receiving module, configured to receive a search request sent from the search server;

an interest model extraction module, configured to extract a user interest model from user personalized data according to the received search request, and send the user interest model to a member engine selection module;

a meta index collection module, configured to receive a meta index reported by each member engine;

the member engine selection module, configured to select a member engine according to the meta index of each member engine, the search request, and the user interest model; and a member engine return module, configured to return the selected member engine to the search server, so as to enable the search server to send the search request to the selected member engine, and enable the selected member engine to complete searching according to the search request.

A search server is provided, which includes:

a receiving module, configured to receive a search request and a user interest model sent from an application server;

a meta index collection module, configured to receive a meta index reported by each member engine;

a member engine selection module, configured to select a member engine according to the meta index of each member engine, the search request, and the user interest model; and a search request distribution module, configured to send the search request to the selected member engine, so as to enable the selected member engine to complete searching according to the search request.

What is claimed is:

1. A search method, comprising:
   receiving a search request from a search client;
   extracting a user interest model from user personalized data according to the search request;
   obtaining a meta index of each member engine;
   selecting a member engine according to the meta index of each member engine, the search request, and the user interest model; and
   sending the search request to the selected member engine, so as to enable the selected member engine to complete searching;
   wherein the user interest model is a vector formed with scores given to each of several interest dimensions denoting user interests;
   the user interest model comprises a static interest model and a dynamic interest model: the static interest model is obtained by obtaining frequencies of words belonging to a certain interest dimension in a static user profile of a user, calculating a sum of the frequencies of the words belonging to the interest dimension as a score of the interest dimension, and forming a score vector with different scores to create a static interest model; and
   the dynamic interest model is obtained by obtaining frequencies of words belonging to a certain interest dimension in a document clicked in a search history of a user, calculating a sum of the frequencies of the words belonging to the interest dimension in the document as a score specific to the interest dimension in the document, forming a score vector specific to the document with different scores specific to different interest dimensions, and a sum of the score vectors specific to different documents to create a dynamic interest model.

2. The method according to claim 1, wherein:
   receiving the search request, extracting the user interest model, and sending the search request to the selected member engine are completed by a search server; and
   selecting the member engine comprises:
   sending, by the search server, the search request and the user interest model to a scheduling server;
   selecting, by the scheduling server, the member engine according to the meta index of each member engine, the search request, and the user interest model; and
   sending, by the scheduling server, the selected member engine to the search server.

3. The method according to claim 1, wherein:
   receiving the search request, and sending the search request to the selected member engine are completed by a search server; and
   extracting the user interest model and selecting the member engine comprise:
   sending, by the search server, the search request to a scheduling server;
   extracting, by the scheduling server, the user interest model from the user personalized data according to the search request, and selecting the member engine according to the meta index of each member engine, the search request, and the user interest model; and
   sending, by the scheduling server, the selected member engine to the search server.

4. The method according to claim 1, wherein:
   receiving the search request, and extracting the user interest model from the user personalized data according to the search request are completed by an application server; and
   selecting the member engine comprises:
   sending, by the application server, the search request and the user interest model to a search server; and
   selecting, by the search server, the member engine according to the meta index of each member engine, the search request, and the user interest model.

5. The method according to claim 1, wherein the extracting the user interest model from the user personalized data according to the search request comprises:
   extracting the user interest model from the user personalized data after the search request is received; or extracting the user interest model from the user personalized data in advance, and directly obtaining the user interest model extracted from the user personalized data in advance after the search request is received.

6. The method according to claim 1, further comprising:
   forwardly weighing the score vector specific to the document when an evaluation on the clicked document by the user is good;
   inversely weighing the score vector specific to the document when an evaluation on the clicked document by the user is not good; or\
   descending the score vector specific to the document with time lapsed after the document is clicked.

7. The method according to claim 1, wherein the extracting the user interest model from the user personalized data further comprises:
   normalizing the static interest model and the dynamic interest model respectively, calculating the sum of the static interest model and the dynamic interest model, and using the result as the user interest model; or
   weighted summing the static interest model and the dynamic interest model, normalizing the sum, and using the result as the interest model.

8. The method according to claim 1, wherein the meta index is statistical data of one or any combination of a database, and a sub-database corresponding to the member engine, a document or a record contained in the database, a document or a record contained in the sub-database, and a term contained in the document or the record.

9. The method according to claim 8, wherein the meta index comprises one or any combination of:

maximum normalized weight vector mnw=mnw1, mnw2, ..., mnwi, ... mnwp) of term, wherein mnwi is a maximum normalized weight of a term ti relative to all documents in a database or sub-database corresponding to the member engine;

average normalized weight vector anw=(anw1, anw2, ... anwi, ..., anwp) of term, wherein anwi is an average normalized weight of a teen ti relative to all documents in a database or sub-database corresponding to the member engine;

maximum normalized weight vector mnv=(mnv1, mnv2, ..., mnvi, ..., mnvn) of an interest model of a document in a database or sub-database, wherein mnvi is a maximum normalized weight of the $i^{th}$ dimension of the interest model of the document relative to all the documents in the database or sub-database corresponding to the member engine;

average normalized weight vector anv=(anv1, anv2, ..., anvi, ..., anvn) of an interest model of a document in a database or sub-database, wherein anvi is an average normalized weight of the $i^{th}$ dimension of the interest model of the document relative to all the documents in the database or sub-database corresponding to the member engine;

global inverse document frequency gidfi of a term ti relative to a database, wherein gidfi=1/dfi, and dfi is the number of documents containing the term ti in the database corresponding to the meta index;

global inverse document frequency IM_gidfi corresponding to the $i^{th}$ dimension of an interest model of a document, wherein IM_gidfi=1/IM_IDFi, and IM_IDFi is the number of documents containing terms belonging to the $i^{th}$ dimension of the interest model of the document in a database or sub-database;

global inverse document frequency gidfi=log(n/(gdfi+1)) of a term ti relative to a database, wherein gdfi is a sum of the number of the documents containing the term ti in the databases or sub-databases corresponding to all member engines, and n is a sum of the number of the documents contained in all member engines; and global inverse document frequency IM_gidfi=log(n/(IM_gdfi+1)) corresponding to the $i^{th}$ dimension of an interest model of a document, wherein IM_gdfi is a sum of the number of documents containing terms belonging to the $i^{th}$ dimension of the interest model of the document in the databases or sub-databases corresponding to all member engines, and n is a sum of the number of all the documents contained in all member engines.

10. The method according to claim 8, wherein selecting the member engine according to the meta index of each member engine, the search request and the user interest model comprises:

obtaining a first similarity of a first document in a certain database to a search request vector Q, wherein the first document satisfies a condition that the similarity of the first document to the search request vector Q is the highest; the search request vector Q=(q1, q2, ... qi ... qk), and qi is a weight of a term ti in the search request;

obtaining a second similarity of a second document in the database to a user interest model R, wherein the second document satisfies a condition that the similarity of the second document to the user interest model vector R is the highest while a matching degree with a vector Q' (q1', q2' ... qm') meets a specified threshold value, the vector Q' is a conversion form of the search request vector Q specific to the user interest model vector R, the user interest model vector R=(r1, r2, ... ri ..., rn), and ri is a weight score of the $i^{th}$ dimension of the user interest model;

selecting a higher value from the first similarity and the second similarity as a similarity of a combination of the search request and the user interest model to the database;

repeating the above method, so as to obtain the similarity of the combination of the search request and the user interest model to each database, wherein each database is corresponding to a member engine; and ranking each database according to the similarity of the combination of the search request and the user interest model to each database, and selecting member engines corresponding to one or more databases having larger similarities ranked top.

11. The method according to claim 10, wherein obtaining the first similarity comprises:

calculating a value of $$\underset{1 \leq i \leq k}{\text{Max}}\left(\left(qi*gidfi*mnwi + \sum_{j=1, j \neq 1}^{k} qj*gidfj*anwj\right) \bigg/ |Q| + \sum_{j=1}^{n} rj*anvj/|R|\right)$$

as the first similarity;

the obtaining the second similarity comprises:

calculating a value of $$\underset{1 \leq i \leq n}{\text{Max}}\left(\text{if } (sim(V(mnvi, anvj(j \neq i, 1 \leq j \leq n)), Q') > T)\right.$$

$$\text{then } \left(\left(ri*mnvi + \sum_{j=1, j \neq i}^{n} rj*anvj\right) \bigg/ |R| + \sum_{i=1}^{k} qi*gidfi*anwi/|Q|\right)$$

as the second similarity;

wherein |Q| is a norm of the search request vector Q; is a norm of the user interest model R; Q' is calculated by mapping a value of qi into a weight of a certain dimension in the user interest model if the term ti belongs to the scope of the dimension in the user interest model, adding the weights of the same dimension to obtain qi', and then normalizing; V is a vector formed with mnvi and anvj ($j \neq i, 1 \leq j \leq n$); sim(V(mnvi,anvj($j \neq i, 1 \leq j \leq n$)), Q') is a cosine similarity of the vector V and the vector Q'; T is a threshold value, and $0 \leq T \leq 1$; and i, k, j, and n are natural numbers.

12. The method according to claim 10, wherein obtaining the first similarity comprises: calculating a value of $$\underset{1 \leq i \leq k}{\text{Max}}\left(\left(qi*gidfi*mnwi + \sum_{j=1, j \neq i}^{k} qj*gidfj*anwj\right) \bigg/ |Q| + \sum_{j=1}^{n} rj*anvj*\text{IM\_gidfj}/|R|\right)$$

as the first similarity; obtaining the second similarity comprises: calculating a value of $$\underset{1\leq i\leq n}{\text{Max}} \left( \text{if } (sim(V(\text{IM\_gidfi}*mnvi, \text{IM\_gidfj}*anvj(j\neq i, 1\leq j\leq n)), Q') > T) \right.$$

$$\text{then } \left( \left( ri*mnvi*\text{IM\_gidfi} + \sum_{j=1,j\neq i}^{n} rj*anvj*\text{IM\_gidfj} \right) / |R| + \right.$$

$$\left. \sum_{i=1}^{k} qi*gidfi*anwi \right) / |Q| \right)$$

as the second similarity;
wherein |Q| is a norm of the search request vector Q, |R| is a norm of the user interest model R; Q' is calculated by mapping a value of qi into a weight of a certain dimension in the user interest model if the term ti belongs to the scope of the dimension in the user interest model, adding the weights of the same dimension to obtain qi', and then normalizing; V is a vector formed with IM_gidfi*mnvi and IM_gidfj*anvj(j≠i,1≦j≦n); sim(V(IM_gidfi*mnvi, IM_gidfj*anvj(j≠i,1≦j≦n)), Q') is a cosine similarity of the vector V and the vector Q'; T is a threshold value, and 0<T≦1; and i, k, j, and n are natural numbers.

13. The method according to claim 10, wherein obtaining the first similarity comprises: calculating a value of $$\underset{1\leq i\leq k}{\text{Max}} \left( \left( qi*gidfi*mnwi + \sum_{j=1,j\neq i}^{k} qj*gidfj*anwj \right) / |Q| + \right.$$

$$\left. \sum_{j=1}^{n} rj*anvj*\text{IM\_gidfj}/|R| \right)$$

as the first similarity;
obtaining the second similarity comprises: calculating a value of $$\underset{1\leq i\leq n}{\text{Max}} \left( \text{if } (sim(V(mnvi, anvj(j\neq i, 1\leq j\leq n)), Q') > T) \right.$$

$$\text{then } \left( \left( ri*mnvi*\text{IM\_gidfi} + \sum_{j=1,j\neq i}^{n} rj*anvj*\text{IM\_gidfj} \right) / |R| + \right.$$

$$\left. \sum_{i=1}^{k} qi*gidfi*anwi \right) / |Q| \right)$$

as the second similarity;
wherein, |Q| is a norm of the search request vector Q; |R| is a norm of the user interest model R; Q' is calculated by mapping a value of qi into a weight of a certain dimension in the user interest model if the term ti belongs to the scope of the dimension in the user interest model, adding the weights of the same dimension to obtain qi', and then normalizing; V is a vector formed with mnvi and anvj (j≠i,1≦j≦n); sim(V(mnvi,anvj(j≠i,1≦j≦n)), Q') is a cosine similarity of the vector V and the vector Q'; T is a threshold value, and 0≦T≦1; and i, k, j, and n are natural numbers.

14. A search system, comprising:
a search service subsystem having a processor and a storage including instructions that, when executed by the processor, cause the processor, to receive a search request, receive a meta index reported by each member engine, select a member engine according to the meta index of each member engine, the search request, and a user interest model, and send the search request to the selected member engine; and
at least one member engine, configured to report the meta index of the member engine to the search service subsystem, and receive the search request sent from the search service subsystem, so as to complete searching;
wherein the user interest model is a vector formed with scores given to each of several interest dimensions denoting user interests;
the user interest model comprises a static interest model and a dynamic interest model: the static interest model is obtained by obtaining frequencies of words belonging to a certain interest dimension in a static user profile of a user, calculating a sum of the frequencies of the words belonging to the interest dimension as a score of the interest dimension, and forming a score vector with different scores to create a static interest model; and
the dynamic interest model is obtained by obtaining frequencies of words belonging to a certain interest dimension in a document clicked in a search history of a user, calculating a sum of the frequencies of the words belonging to the interest dimension in the document as a score specific to the interest dimension in the document, forming a score vector specific to the document with different scores specific to different interest dimensions, and a sum of the score vectors specific to different documents to create a dynamic interest model.

15. The search system according to claim 14, wherein the search service subsystem further comprises instructions that, when executed by the processor, cause the processor to extract the user interest model from user personalized data according to the search request, so as to select the member engine according to the meta index of each member engine, the search request, and the user interest model.

16. The search system according to claim 15, wherein the search service subsystem comprises a search server and a user database,
the user database is configured to store or provide user personalized data; and
the search server is configured to receive the search request sent from a search client; extract the user interest model from the user personalized data according to the search request; obtain the meta index of each member engine; select the member engine according to the meta index of each member engine, the search request, and the user interest model; and send the search request to the selected member engine.

17. The search system according to claim 15, wherein the search service subsystem comprises a search server, a scheduling server, and a user database,
the user database is configured to store or provide user personalized data;
the search server is configured to receive the search request sent from a search client, extract the user interest model from the user personalized data according to the search request, send the user interest model and the search request to the scheduling server, receive the member engine selected and returned by the scheduling server, and send the search request to the selected member engine; and
the scheduling server is configured to receive the user interest model and the search request sent from the search server; obtain the meta index of each member engine; select the member engine according to the meta index of each member engine, the search request, and the user interest model;

and return the selected member engine to the search server.

18. The search system according to claim 15, wherein the search service subsystem comprises a search server, a scheduling server, and a user database,
- the user database is configured to store or provide user personalized data;
- the search server is configured to receive the search request sent from a search client, send the search request to the scheduling server, receive the member engine selected and returned by the scheduling server, and send the search request to the selected member engine; and
- the scheduling server is configured to receive the search request sent from the search server, extract the user interest model from the user personalized data according to the search request, and acquire the meta index of each member engine; select the member engine according to the meta index of each member engine, the search request, and the user interest model; and return the selected member engine to the search server.

19. The search system according to claim 15, wherein the search service subsystem comprises a search server, an application server, and a user database,
- the user database is configured to store or provide user personalized data;
- the application server is configured to receive the search request sent from a client, extract the user interest model from the user personalized data according to the search request; and send the search request and the user interest model to the search server; and
- the search server is configured to receive the search request and the user interest model sent from the application server, receive the meta index reported by each member engine, and select the member engine according to the meta index of each member engine, the search request, and the user interest model; and send the search request to the selected member engine.

* * * * *

UNITED STATES PATENT AND TRADEMARK OFFICE
CERTIFICATE OF CORRECTION

PATENT NO. : 8,527,509 B2  
APPLICATION NO. : 13/070265  
DATED : September 3, 2013  
INVENTOR(S) : Hanqiang Hu Page 1 of 1

It is certified that error appears in the above-identified patent and that said Letters Patent is hereby corrected as shown below:

In the claims

Column 18, Claim 5, Line 35, delete "the", second occurrence;

Column 19, Claim 9, Line 12, delete "teen" and insert -- term --;

Column 20, Claim 11, Line 31, delete "the"; and

Column 20, Claim 11, Line 44, after Q; insert -- |R| --.

Signed and Sealed this  
Twenty-seventh Day of October, 2015

Michelle K. Lee  
*Director of the United States Patent and Trademark Office*